United States Patent [19]
Nolan et al.

[11] Patent Number: 5,498,365
[45] Date of Patent: Mar. 12, 1996

[54] ELECTROOPTICAL LIQUID CRYSTAL SYSTEM

[75] Inventors: Patrick Nolan, Poole; David Coates, Wimborne, both of Great Britain

[73] Assignee: Merck Patent Gesellschaft MIT Beschrankter Haftung, Darmstadt, Germany

[21] Appl. No.: 104,121

[22] PCT Filed: Jun. 2, 1993

[86] PCT No.: PCT/EP93/01378

§ 371 Date: Aug. 13, 1993

§ 102(e) Date: Aug. 13, 1993

[87] PCT Pub. No.: WO93/24589

PCT Pub. Date: Dec. 9, 1993

[30] Foreign Application Priority Data

Jun. 3, 1992 [GB] United Kingdom ............. 9211731

[51] Int. Cl.[6] .................. C09K 19/52; G02F 1/13
[52] U.S. Cl. ............. 252/299.01; 252/299.61; 252/299.63; 252/299.64; 252/299.66; 359/103
[58] Field of Search ............. 252/299.01, 299.61, 252/299.63, 299.64, 299.65, 299.66, 299.67; 359/50, 51, 103

[56] References Cited

U.S. PATENT DOCUMENTS

| | | | |
|---|---|---|---|
| 5,242,616 | 9/1993 | Finkenzehler et al. | 252/299.01 |
| 5,323,251 | 6/1994 | Coates et al. | 359/51 |
| 5,356,557 | 10/1994 | Jubb et al. | 252/299.01 |

FOREIGN PATENT DOCUMENTS

| | | |
|---|---|---|
| 0275999 | 7/1988 | European Pat. Off. . |
| 0484972 | 5/1992 | European Pat. Off. . |
| 0484163 | 5/1992 | European Pat. Off. . |
| WO92/04421 | 3/1992 | WIPO . |

OTHER PUBLICATIONS

Hirai et al., "Phase diagram and phase separation in lc/prepolymer mixture", *SPIE, Liquid Crystal Displays and Applications*, vol. 1257 (1990), pp. 2–8.

*Primary Examiner*—Shean Wu
*Attorney, Agent, or Firm*—Millen, White, Zelano, & Branigan

[57] ABSTRACT

An electrooptical system
  which between 2 electrode layers contains a PDLC film comprising a liquid crystal mixture forming microdroplets in an optically isotropic, transparent polymer matrix,
  in which one of the refractive indices of the liquid crystal mixture is matched to the refractive index of the polymer matrix, and
  which in one of the two switching states has reduced transmission compared with the other state independent of the polarization of the incident light,
  characterized in that the precursor of the PDLC film comprises
    a) 50–90 wt. % of a liquid crystal mixture containing one or more compounds of the formula I

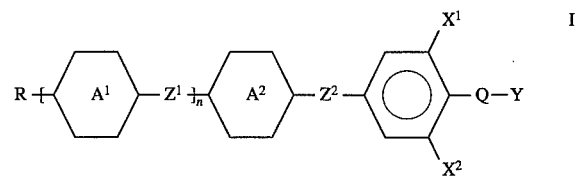

b) 15–49.5 wt. % of the precursor of the polymer matrix.

24 Claims, 4 Drawing Sheets

5,498,365

ELECTROOPTICAL LIQUID CRYSTAL SYSTEM

The invention relates to an electrooptical liquid crystal system which between 2 electrode layers contains a PDLC film comprising a liquid crystal mixture being dispersed in the form of microdroplets in an optically isotropic, transparent polymer matrix, in which one of the refractive indices of the liquid crystal mixture is matched to the refractive index of the polymer matrix, and which in one of the two switching states has a reduced transmission compared with the other state independent of the polarization of the incident light.

BACKGROUND OF THE INVENTION

In PDLC films which are described, for example, in U.S. Pat. No. 4,688,900, Mol. Cryst. Liq. Cryst. Nonlin. Optic, 157, 1988, 427–441, WO 89/06264 and EP 0,272,585, one of the refractive indices of the liquid crystal mixture, customarily the ordinary refractive index $n_o$, is selected in such a way that it more or less coincides with the refractive index $n_p$ of the polymeric matrix. If no voltage is applied to the elec- trodes, the liquid crystal molecules in the droplets exhibit a distorted alignment, and incident light is scattered at the phase boundary between the polymeric and liquid crystal phases.

On applying a voltage, the liquid crystal molecules are aligned parallel to the field and perpendicular to the E vector of the transmitted light. Normally incident light (viewing angle $\theta=0°$) now sees an optically isotropic medium and appears transparent.

No polarizers required for operating PDLC systems, as a result of which these systems have high transmission. PDLC systems provided with active matrix addressing have been proposed on the basis of these favorable transmission properties in particular for projection applications, but in addition also for displays having high information content and for further applications.

A series of matrix materials and polymerization processes have hitherto been proposed for producing PDLC systems. In the so called PIPS technology (=polymerization-induced phase separation) the liquid crystal mixture is firstly homogenously mixed with monomers and/or oligomers of the matrix-forming material; phase-separation is then induced by polymerization. Differentiation must further be made between TIPS (temperature-induced phase separation) and SIPS (solvent-induced phase separation) (Mol. Cryst. Liq. Cryst. Inc. Nonlin. Opt. 157 (1988) 427)both also being methods to produce PDLC films.

The process of preparation must be controlled very carefully in order to obtain systems with good electrooptical properties. F. G. Yamagishi et al., SPIE Vol. 1080, Liquid Crystal Chemistry, Physics and Applications, 1989, p.24 differentiate between a "Swiss cheese" and a "polymer ball" morphology. In the latter one, the polymer matrix consists of small polymer particles or "balls" being connected or merging into each other while in the Swiss cheese system, the polymer matrix is continuous and exhibits well defined, more or less spherical voids containing the liquid crystal. The Swiss cheese morphology is preferred because it exhibits a reversible electrooptical characteristic line while the polymer ball system shows a distinct hysteresis generally leading to a drastic deterioration of the electrooptical characteristic line when comparing the virgin and the second run. According to Yamagishi et al., the Swiss cheese morphology is distinctly favored if the precursor of the matrix is a thiolene system, i.e. contains a thiol- and an ene-component.

PDLC systems the precursor of the matrix of which is purely based on ene-type compounds, are described in EP 0,272,585 and in Y.Hirai et al., SPIE Vol. 1257, Liquid Crystal Displays and Applications, 1990, p. 6. EP 0,272,585 favors systems with a high oligomer concentration of 15–70% and Hirai describes PDLC films the precursor of the matrix of which consists of monofunctional acrylates and acrylate oligomers in varying ratios. Both precursors, however, tend to disadvantageously form PDLC film with a morphology which is different from the "Swiss cheese" morphology.

PDLC systems, another complication is that the liquid crystal mixture usually tends to dissolve into the polymer matrix to a lesser or higher degree. In the polymer matrix, the liquid crystal act as an isotropic material exhibiting a medium refractive index given via $$n^2 = 1/3\, (n_e^2 + 2n_o^2).$$

Inserting typical indices of refraction of a liquid crystal mixture of $n_o=1.52$ and $n_e=1.75$ yields $n=1.6$ which is higher than the index of refraction of polymer matrix materials typically used. This phenomenon therefore leads to an increase of the refractive index of the matrix, and it was suggested that in order to obtain good transmission in the PDLC film, the refractive index of the precursor of the polymer matrix should be somewhat or even substantially lower than the ordinary index of refraction of the liquid crystal mixture.

The liquid crystal mixture used in PDLC films preferably has a positive dielectric anisotropy but the use of dielectrically negative liquid crystal mixtures (see, for example, WO 91/01511) or two-frequency liquid crystal mixtures (see, for example, N. A. Vaz et al., J. Appl. Phys. 65, 1989, 5043) is also discussed.

Furthermore, the liquid crystal mixture should have a high clearing point, a broad nematic range, no smectic phases down to low temperatures and a high stability and should be distinguished by an optical anisotropy $\Delta n$ and a flow viscosity $\eta$ which can be optimized with respect to the particular application, and by a high electrical anisotropy.

Electrooptical systems containing PDLC films can be addressed passively or actively. Active driving schemes employing an active matrix having nonlinear addressing elements integrated with the image point are especially useful for displays with high information content. The nonlinear elements used for preparing the active matrix type electrode film can have 2 or 3 connections. Examples of elements having 2 connections are a-Si:H diodes (N. Szydlo et al., Proc. 3rd Int. Display Res. Conf., Kobe; SID Los Angeles, 1983, p. 416), NINa-Si:H diodes (Z. Yaniv et al., Conf. Rec. 1985 intern. Display Research Conference, IEEE, New York, 1985, p. 76), a-Si:H ring diodes (S. Togashi et al., Proceedings of the 4th International Display Research Conference, SEE, Paris, 1984, p. 141), MIM or MSI diodes (metal-insulator-metal, metal-silicon nitride-indium tin oxide; D. R. Baraff et al., Digest SID International Symposium, Los Angeles, 1980, p. 200; M. Suzuki et al., Proceedings of the 6th International Display Research Conference, Japan Display '86, 1986, p. 72) or ZnO varesistors (D. E. Castleberry et al., SID '82 Digest, 1982, p. 246). The nonlinear elements having 3 connections are thin film transistors (TFT), of which several types are discussed and which differ in the semiconductor material used (for example a-Si:H, p-Si, CdSe, Te and other materials; see, for example, P.M. Knoll, Displays, Heidelberg 1986, p. 216; T. Nishimura, Mat. Res. Soc. Symp. Proc. 33, (1984) 221; C. S. Bak et al., Mat. Res. Soc, Symp. Proc. 33 (1984) 215; W. G. Hawkins et al., Mat. Res. Soc. Symp. Proc. 33, (1984) 231; M. Matsuura et al., SID 1983 Symposium Digest, 1983 p. 148).

When nonlinear elements having 3 connections are used, only one connection is usually required for the counter electrode, while in the case of active matrix addressings, which are based on elements having 2 connections, the counter electrode is usually also scanned. However, active matrix addressings based on elements having 2 connections and in which only one electrode is scanned have also been proposed (Y. Baron et al., Proceedings of the 6th International Research Conference 1986, Japan Display '86, p. 86), and furthermore the use of TFTs as an element having only 2 connections has also been discussed (C. Hilsum et al., Displays, January 1986 p. 37).

More details on the addressing of liquid crystal displays by an active matrix of nonlinear elements can be found, for example, in A. H. Firester, SID, 1987, Society for information Display Seminar, Seminar 5: Active Matrices for Liquid Crystals, E. Kaneko, Liquid Crystal Displays, KTK Scientific Publishers, Tokyo, Japan, 1987, chapter 6 and 7 or P.M. Knoll, Displays, Heidelberg, 1986, p. 216 ff.

When the PDLC system is addressed by means of an active matrix, some further far reaching criteria are added to the requirements listed so far.

The first one is related to the fact that each image point represents a capacitive load with respect to the particular active nonlinear element, which is charged at the rhythm of the addressing cycle. In this cycle, it is of paramount importance that the voltage applied to an addressed image point drops only slightly until the image point is again charged in the next addressing cycle. A quantitative measure of the drop in voltage applied to an image point is the so-called holding ratio (HR) which is defined as the ratio of the drop in voltage across an image point in the nonaddressed state and the voltage applied; a process for determining the HR is given, for example, in Rieger, B. et al., Conference Proceeding der Freiburger Arbeitstagung Flüssigkristalle (Freiburg Symposium on Liquid Crystals), Freiburg 1989. Electrooptical systems having a low or relatively low HR show insufficient contrast.

In the case of active matrix addressing, it is furthermore essential that the PDLC film exhibits rather low to very low operating voltages in order to be compatible with customary driving electronics.

A third important point in case of active matrix addressed systems is the demand for low hysteresis.

It is true that considerable efforts have already been undertaken hitherto to optimize PDLC systems with respect to the precursor of the polymer matrix and the liquid crystal mixture used. On the other hand, however, it is still an open problem how to reliably obtain PDLC films which are characterized by a Swiss cheese morphology, a high contrast and/or, in particular, a high on-state clarity, and especially by low operating voltages.

Furthermore, only few investigations of PDLC systems having active matrix addressing can be found in the literature, and no concepts have so far been proposed for providing electrooptical systems having a high HR, a Swiss cheese morphology a high contrast and/or a high on-state clarity, and low operating voltages.

Consequently, there is a high demand for PDLC systems which fulfill to a large extent the requirements described and which exhibit both a Swiss cheese morphology and a high contrast and/or, in particular, a high on-state clarity. Furthermore, there is a high demand for actively addressed PDLC systems which exhibit a high HR and especially low operating voltages in addition to these properties.

The object of the invention was to provide PDLC systems of this type and precursors of these PDLC systems containing monomers, oligomers and/or prepolymers of the polymer used and a liquid crystal mixture. Other aims of the present invention are immediately evident to the person skilled in the art from the following detailed description.

SUMMARY OF THE INVENTION

It has been found that PDLC systems with a Swiss cheese morphology, a high on-state clarity and low operating voltages can be obtained if the precursor of the PDLC system comprises a) 50–90 wt. % of a liquid crystal mixture containing one or more compounds of the formula I

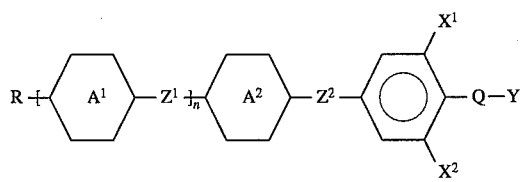

in which
$Z^1$ and $Z^2$ independently of one another, are a single bond, —CH$_2$CH$_2$—, —COO—, —OCO— or —C≡C—,

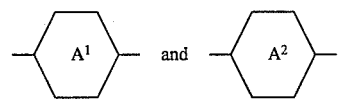

and independently of one another, are trans-1,4-cyclohexylene, 1, 4-phenylene, 2-fluoro-1,4-phenylene, 3-fluoro-1,4-phenylene, 2,3, - 3,5-, 2,5- or 2,6-difluoro-1,4-phenylene and one of

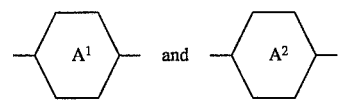

is also pyrimidine-2,5-diyl, pyridine-2,5-diyl or trans-1,3-dioxane- 2,5-diyl,
$X^1$ and $X^2$ independently of one another are H or F,
Q is (O)$_m$—C$_r$F$_p$H$_{r-p}$ or a single bond,
Y is F, Cl or CN,
m is 0 or 1
r is 1, 2, 3 or 4,
p is 0, 1, 2, . . . 2r
n is 0, 1 or 2 and
R is alkyl having up to 13 C atoms, in which one or two non-adjacent CH$_2$ groups can also be replaced by —O— and/or —CH=CH—, b) 15–49.5 wt. % of the precursor of the polymer matrix at least comprising
a component A containing between 40–95 wt. % of one or more monofunctional monomers of the ene-type, a component B containing between 1–13 wt. % of one or more at least difunctional monomers of the ene-type, a component C containing between 1–30 wt. % of one or more mono-, di- or multifunctional oligomers of the ene-type, c) 0.01–5 wt. % of a radical photoinitiator with the mass ratios given under a), b) and c) being related to the mass of the precursor of the PDLC film and the mass ratios of the components A, B and C relating to the mass of the precursor of the polymer matrix.

Furthermore, it has been found that PDLC systems which are characterized by a Swiss cheese morphology, good transmission properties, a high HR and low operating voltages can be obtained if the percentage of the carbonitrile compounds according to formula I is not too high and especially not more than 15%. Especially preferred for active matrix applications are PDLC system the liquid crystal mixture of which contains less than 5% and in particular no carbonitriles.

The invention thus relates to an electrooptical liquid crystal system which between 2 electrode layers contains a PDLC film comprising a liquid crystal mixture forming microdroplets in an optically isotropic, transparent polymer matrix, in which one of the refractive indices of the liquid crystal mixture is essentially matched to the refractive index of the polymer matrix, which in one of the two switching states has reduced transmission compared with the other state essentially independent of the polarization of the incident light, whose precursor of the PDLC film is selected as stated above.

The construction of the electrooptical system according to the present invention corresponds to the mode of construction customary for systems of this type. The term customary mode of construction is in this case broadly interpreted and includes adaptations and modifications.

Thus, for example, the matrix formed by the transparent medium in which the liquid crystal mixture is microdispersed or microencapsulated, is arranged between conducting electrodes like a sandwich.

The electrodes are applied, inter alia, to substrate sheets of, for example, glass, plastic or the like; if desired, however, the matrix can also be provided directly with electrodes so that the use of substrates can be avoided. One of the electrodes forms an active matrix while the other one acts as counter electrode.

The electrooptical system according to the invention can be operated reflectively or transmissively so that at least one electrode and, if present, the associated substrate are transparent. Both systems customarily contain no polarizers, as a result of which a distinctly higher light transmission results. Furthermore, no orientation layers are necessary, which is a considerable technological simplification in the production of these systems compared with conventional liquid crystal systems such as, for example, TN or STN cells.

Processes for the production of PDLC films are described, for example, in U.S. Pat. No. 4,688,900, U.S. Pat. No. 4,673,255, U.S. Pat. No. 4,671,618, WO 85/0426, U.S. Pat. No. 4,435,047, EP 0,272,595, Mol. Cryst. Liq. Cryst, Inc. Nonlin. Opt. 157 (1988) 427, Liquid Crystals, 3 (1988) 1543, EP 0,165,063, EP 0,345,029, EP 0,357,234 and EP 0,205,261. The formation of the PDLC film is generally achieved by 3 basic methods: in the PIPS technique (=PIPS, polymerization induced phase separation) the liquid crystal mixture, and optionally further additives, are dissolved in the precursor of the matrix material, and subsequently polymerization is started. TIPS (=thermally induced phase separation) means that the liquid crystal mixture is dissolved in the melt of the polymer followed by cooling while SIPS (=solvent induced phase separation) starts with dissolving the polymer and the liquid crystal mixture in a solvent with subsequent evaporation of the solvent. The invention is, however, not restricted to these specific techniques but covers also electrooptical systems obtained by modified methods or other methods. The use of the PIPS technology is usually preferred.

The thickness d of the electrooptical system is customarily chosen to be small in order to achieve a threshold voltage $V_{th}$ which is as low as possible. Thus, for example, layer thicknesses of 0.8 and 1.6 mm are reported in U.S. Pat. No. 4,435,047, while values for the layer thickness between 10 and 300 µm are given in U.S. Pat. No. 4,688,900 and between 5 and 30 µm in EP 0,313,053. The electrooptical systems according to the invention only have layer thicknesses d greater than a few mm in exceptional cases; layer thicknesses below 200 µm and especially below 100 µm are preferred. In particular, the layer thickness is between 2 and 50 µm and especially between and 25 µm.

An essential difference between the electrooptical liquid crystal system according to the present invention and those customary hitherto exists, however, in that the precursor of the PDLC film comprises a) 50–90 wt. % of a liquid crystal mixture containing at least one compound of formula I b) 15–49.5 wt. % of the precursor of the polymer matrix at least comprising a component A containing between 40–95 wt. % of one or more monofunctional monomers of the ene-type, a component B containing between 1–13 wt. % of one or more at least difunctional monomers of the ene-type, a component C containing between 1–30 wt. % of one or more mono-, di- or multifunctional oligomers of the ene-type, c) 0.01–5 wt. % of a radical photoinitiator with the mass ratios given under a), b) and c) being related to the mass of the precursor of the PDLC film and the mass ratios of the components A, B and C relating to the mass of the precursor of the polymer matrix.

In the following, for the sake of simplicity, Phe is 1,4-phenylene, Phe.2F is 2-fluoro-1,4-phenylene, Phe.3F is 3-fluoro-1,4-phenylene, Cyc is trans-1,4-cyclohexylene, Pyr is pyrimidine-2,5-diyl and Pyd is pyridine-2,5-diyl, the two abbreviations Pyr and Pyd comprising in each case the two possible positional isomers. Furthermore, Phe. (F) is intended to designate a 1,4-phenylene group which is difluorinated in the 2 and 3, 3 and 5, 2 and 6 or 2 and 5, positions respectively.

Liquid crystal compounds according to formula I, wherein Y is F or Cl will be termed in the following as SFM compounds (superfluorinated materials) according to formula I.

Electrooptical systems whose liquid crystal mixture contains one or more binuclear compounds of the formula I2 are preferred:

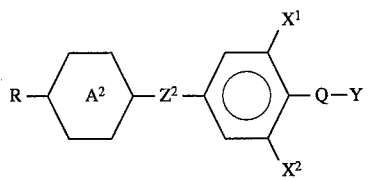

In the compounds of the formula I2, R is preferably alkyl or alkoxy having 1–10, but in particular 1–8 C atoms, the straight-chain radicals being preferred. Furthermore, n-alkoxyalkyl compounds and in particular n-alkoxymethyl and n-alkoxyethyl compounds are preferred.

$Z^2$ is preferably —CH$_2$CH$_2$—, —COO— or a single bond, in particular a single bond or —CH$_2$CH$_2$— and very particularly a single bond. Q—Y, preferably is —F, —Cl, —CN, —OCHF$_2$, —OCF$_3$ or —CF$_3$, specifically —F, —Cl or —CN; in the case of actively addressed PDLC systems according to the present invention Q—Y is preferably —F, —Cl or —OCF$_3$.

Compounds of the formula I2 in which at least one of $X_1$ and $X_2$ is different from H and/or in which

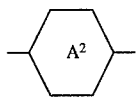

is laterally mono-or difluorinated, are particularly preferred.

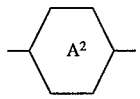

is preferably Cyc, Phe.(F), Phe.3F5F, Phe.2F3F, Pyr, Pyd or Dio and in particular Cyc, Phe. (F), Phe.3F5F, Phe.2F3F, Pyr or Pyd.

Furthermore, electrooptical systems whose liquid crystal mixture contains one or more trinuclear compounds of the formula I3 are preferred:

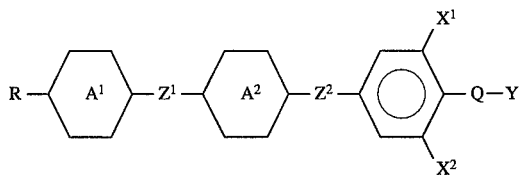

In the compounds of the formula I3, R is preferably n-alkyl or n-alkoxy having 1–10 C atoms, furthermore also n-alkoxymethyl or n-alkoxyethyl having 1–8 C atoms and n-alkenyl having up to 7 C atoms.

Very particular preference is given to compounds of the formulae I3 in which R is methyl, ethyl, propyl, butyl, pentyl, hexyl, heptyl, octyl, nonyl, decyl, methoxy, ethoxy, propoxy, butoxy, pentoxy, hexoxy, heptoxy, octoxy, methoxy-methyl, ethoxymethyl, propoxymethyl, butoxymethyl, methoxy-ethyl, ethoxyethyl or propoxyethyl. $Z^1$ and $Z^2$ in the compounds of the formulae I3 are, independently of one another, preferably —CH$_2$CH$_2$—, —COO— or a single bond and in particular —CH$_2$CH$_2$— or a single bond. Particular preference is given to those compounds of the formula I3 in which at least one of Z1 or $Z^2$ is a single bond. Q—Y preferably is —F, —Cl, —CN, —OCHF$_2$, —OCF$_3$ or —CF$_3$ and specifically —F, —Cl, —CN, —OCHF$_2$ or —OCF$_3$; in the case of actively addressed PDLC systems according to the present invention Q—Y is in particular —F, —Cl, —OCHF$_2$ and —OCF$_3$.

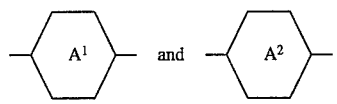

are, independently of one another, Cyc, Phe. (F), Phe.2F3F, Phe.3F5F, Phe.2F3F5F, Pyr, Pyd and Dio and in particular Cyc, Phe. (F), Phe.2F3F, Phe.3F5F, Phe. 2F3F5F, Pyr and Pyd.

The use of compounds of formula I3 is which at least one of $X_1$ and $X^2$ is different from H and/or in which

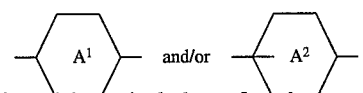

are laterally mono- or difluorinated, is particularly preferred.

Especially preferred is the use of the following trinuclear compounds according to formula I3:

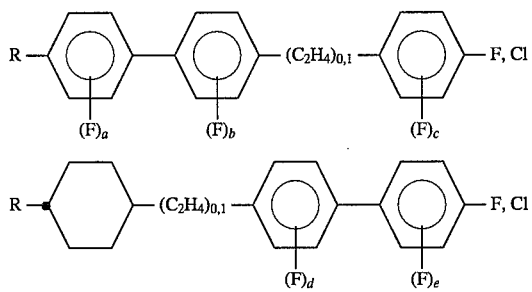

wherein

R has the meaning indicated above, a, b, c, d and e are in each case independently from each other 0, 1, or 2,

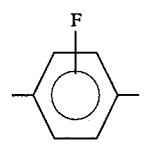

is Phe.2F or Phe.3F,

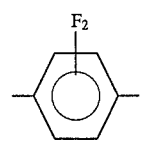

is Phe.3F5F, Phe.2F3F, Phe.2F5F or Phe.2F6F, a+b+c is 1, 2, 3 or 4, preferably 1, 2 or 3, and d+e is 1, 2 or 3, preferably 1 or 2.

The use of di- and trinuclear compounds, according to formulae I2 and I3 with Q—Y=Cl in the liquid crystal mixtures of the PDLC systems according to the present invention is especially preferred because these compounds tend to increase the birefringence of the liquid crystal mixture and the HR of the PDLC system.

Furthermore, electrooptical systems whose liquid crystal mixture contains one or more tetranuclear compounds of the formula I4 are preferred:

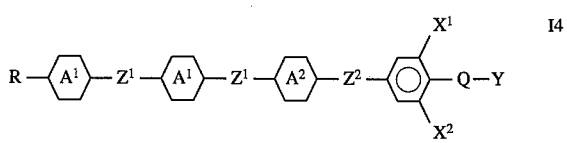

In the compounds of the formulae I4, R is preferably n-alkyl or n-alkoxy having 1–10 C atoms, furthermore also n-alkoxy-methyl or n-alkoxyethyl having 1–8 C atoms.

Very particular preference is given to compounds of the formulae I4 in which R is methyl, ethyl, propyl, butyl, pentyl, hexyl, heptyl, octyl, nonyl, decyl, methoxy, ethoxy, propoxy, butoxy, pentoxy, hexoxy, heptoxy or octoxy.

In the compounds of the formula I4, preferably not more than 2 and in particular only one of the bridges $Z^1$ and $Z^2$ are different from a single bond.

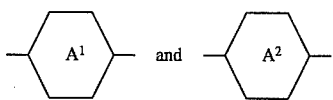

are preferably, independently of one another, Cyc, Phe.2F, Phe.3F, Phe, Pyr or Pyd. Compounds of the formula I4 in which at least one

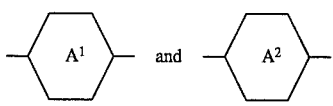

is Phe.2F or Phe.3F are preferred.

The weight proportion of the compounds of the formulae I4 in the liquid crystal mixture of the electrooptical systems according to the invention is, however, preferably not too high and is in particular 0–5% because 4-ring compounds are often found to be not sufficiently soluble in the precursor of the matrix. Especially preferred are systems containing a liquid crystal mixture with no 4-ring compounds according to formula I4.

Since two ring compounds tend to have a low to rather low value of birefringence and a low to rather low clearing point, the use of trinuclear compounds according to formula I3 is especially preferred.

In the compounds according to formulae I2, I3 and I4, $X_1$ and $X_2$ independently from each other, are H or F. Compounds according to formulae I2, I3 and I4 with $X_1$ and/or $X^2$=F tend to exhibit a higher value of the dielectrical anisotropy compared with compounds with $X^1=X_2=H$, but they show at the same time an increased tendency for smectic phases, in particular in case Y=Cl. Electrooptical systems according to the present invention containing at least one compound according to formulae I2, I3 or I4 and, in particular, according to formulae I2 or I3, wherein $X^1=X_2=H$ and at least one of $A^1$ and $A^2$ is independently from each other Phe.2F, Phe.3F or Phe.3F5F, are preferred. Liquid crystal mixtures to be used according to the present invention which contain at least 5% and, in particular, 10% or more of di- and trinuclear compounds according to formulae I2 and I3 with $X^1=X^2=H$ and $A^1$ and/or $A^2=$Phe.2F, Phe.3F or Phe.3F5F and, very specifically, Phe.2F or Phe.3F are especially preferred.

In the compounds according to formulae I2, I3 and I4, $A^1$ and $A^2$ are preferably chosen from the group of ring systems comprising trans-1,4-cyclohexylene, 1,4-phenylene, 2-fluoro- 1,4-phenylene, 3-fluoro-1,4-phenylene or 3,5-difluoro-1,4-phenylene. Heterocyclic ring systems were found to be often less preferred because electrooptical systems containing a liquid crystal mixture with one or more compounds with one or more heterocyclic ring system often exhibit lower values of the holding ratio compared to systems the liquid crystal mixture of which contains only compounds with homocyclic carbon ring systems. A rather small percentage of compounds with one or more heterocyclic ring systems in the liquid crystal mixture used in the system according to the invention, of less than 15%, in particular, of not more 7.5% and very specifically of not more than 5% was often found to be acceptable, in particular in case the system is not to be actively addressed.

The proportion of the compounds of formula I in the liquid crystal mixtures used according to the invention is prefera- bly not too small and is in particular more than 15% and very particularly more than 20%. Liquid crystal mixtures containing 50–100% and in particular, 75–100% of compounds of formula I are particularly preferred.

Increased concentration of the liquid crystal in the PDLC film gives rise to improved film properties such as a lower saturation voltage and better contrast. The precursor of the PDLC film of the systems according to the present invention contains 50–90%, preferably 65–90% and, in particular, at least 70% and very specifically 75% or more of the liquid crystal mixture.

The liquid crystal mixtures used according to the invention can contain further components which are preferably selected from nematic or nematogenic (monotropic or isotropic) substances, in particular substances from the group comprising azoxybenzenes, benzylideneanilines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexylcyclohexanecarboxylates, cyclohexylphenyl benzoate, cyclohexylphenyl cyclohexanecarboxylate, or cyclohexylphenyl cyclohexylcyclohexane-carboxylate, phenylcyclohexanes, cyclohexylbiphenyls, phenyl-cyclohexylcyclohexanes, cyclohexylcyclohexanes, cyclohexyl-cyclohexenes, cyclohexylcyclohexylcyclohexenes, 1,4-bis-(cyclohexyl)benzenes, 4,4'-bis(cyclohexyl)biphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, halogenated or unhalogenated stilbenes, benzyl phenyl ethers, tolans and substituted cinnamic acids. The 1,4-phenylene groups in these compounds can also be fluorinated.

The liquid crystal mixtures used in the electrooptical systems according to the invention preferably also contain one or more dielectrically neutral compounds of the formulae 1–5:

R"—L—E—R'"     1

R"—L—CH$_2$CH$_2$—E—R'"     2

In the formlae 1 and 2 L and E, which may be identical or different, are each, independently of one another, a bivalent radical from the group comprising -Phe-, -Cyc-, -Phe-Phe-, -Phe-Cyc-, -Cyc-Cyc-, -Pyr-, -Dio-, -G-Phe- and -G-Cyc- and mirror images thereof, Phe being unsubstituted or fluorine-substituted 1,4-phenylene, Cyc being trans-1,4-cyclohexylene or 1,4-cyclohexenylene, Pyr being pyrimidine-2, 5-diyl or pyridine-2,5-diyl, Dio being 1,3-dioxane-2,5-diyl and G being 2-(trans-1,4-cyclohexyl)ethyl, pyrimidine-2,5-diyl, pyridine- 2,5-diyl or 1,3-dioxane-2,5-diyl.

One of the radicals L and E is preferably Cyc, Phe or Pyr. E is preferably Cyc, Phe or Phe-Cyc. The liquid crystals according to the invention preferably contain one or more components selected from compounds of the formulae 1 and 2, in which L and E are selected from the group comprising Cyc, Phe and Pyr and simultaneously one or more components are selected from the compounds of the formulae 1 and 2, in which one of the radicals L and E is selected from the group comprising Cyc, Phe and Pyr and the other radical is selected from the group comprising -Phe-Phe-, -Phe-Cyc-, -Cyc-Cyc-, -G-Phe- and -G-Cyc-, and, if desired, one or more components are selected from the compounds of the formulae 1 and 2, in which the radicals L and E are selected from the group com- prising -Phe-Cyc-, -Cyc-Cyc-, -G-Phe- and -G-Cyc-.

R''' and R'' in the compounds of the formulae 1 and 2 are each, independently of one another, preferably alkyl, alkenyl, alkoxy, alkenyloxy or alkanoyloxy having up to 8 carbon atoms. In most of these compounds, R''' and R'' are different from one another, one of these radicals being in particular alkyl, alkoxy or alkenyl.

Especially preferred is the following smaller group of dielectrically neutral compounds of formulae 3 and 4

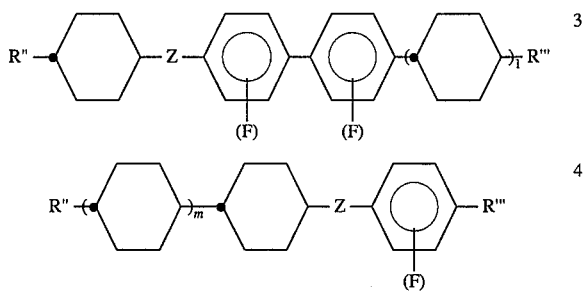

wherein the meaning of R'' and R''' is the same as given for formulae 1 and 2,

Z is independently from each other a single bond or —CH$_2$CH$_2$—, l and m are independently from each other 0 or 1, and

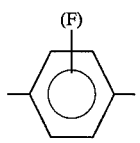

denotes 1,4-phenylene, 2-fluoro-1,4-phenylene or 3-fluoro-1,4-phenylene.

The weight proportion of the compounds of the formulae 1–4 in the liquid crystals used according to the invention is preferably 0–50% and in particular 0–40%.

The liquid crystal mixtures used in the electrooptical systems according to the invention preferably contain 1–100%, in particular 5–95%, of compounds of the formula I. The liquid crystals preferably contain 1–20, but in particular 1–15, and very particularly 1–12 compounds of the formula I.

Liquid crystal mixtures used according to the present invention preferably contain 0–10%, in particular 0–5% of 4-ring compounds, 70–100%, in particular 80–100% of 3-ring compounds, and 0–30%, in particular 0–20% of 2 ring compounds.

One skilled in the art can select additives for the liquid crystal mixtures described from the large pool of nematic or nematogenic substances in such a manner that the birefringence Δn and/or the ordinary refractive index $n_o$ and/or other refractive indices and/or the viscosity and/or the dielectric anisotropy and/or further parameters of the liquid crystal are optimized with respect to the particular application.

The liquid crystal mixture can contain further additives such as, for example, chiral compounds and other customary addi- tives. The concentration of such additives is preferably not more than 7.5% and, in particular, lower than 5%.

It was found out that with conventional ene based precursors as described for example in EP 0,272,585 wherein the amount of the oligomer component in the precursor of the polymer matrix is at least 15%, PDLC films with disadvantageous properties result, specifically with insufficient contrast, an unsatisfactory on-state clarity and often disadvantageous values of HR and operating voltages.

It was found quite generally by the present inventors that the inventive ene-type and specifically acrylate type prepolymers are usable in low voltage PDLC films.

The term ene-type compound denotes olefinically unsaturated compounds and, in particular, acrylates; besides the reactive double bond or acrylate group

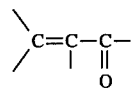

the ene-type compounds can optionally contain other suitable radicals like OH or SH groups.

It was found out in extensive experiments by the present inventors that electrooptical systems with improved properties which in particular do not exhibit the disadvantages mentioned above or exhibit them only to a lesser degree, can be obtained if the precursor of the polymer matrix at least comprises a component A containing between 40–95 wt. % of one or more monofunctional monomers of the ene-type, a component B containing between 1–13 wt. % of one or more at least difunctional monomers of the ene-type, a component C containing between 1–30 wt. % of one or more mono-, di- or multifunctional oligomers of the ene-type.

The mass ratio of the precursor of the matrix with respect to the precursor of the PDLC film is 5–49.5%, preferably between 9.5–34.5%, specifically between 15–34.5% and especially preferred between 15–30%.

Especially preferred are precursors of the PDLC system containing 65–90%, in particular at least 70% and very specifically at least 75% of a liquid crystal mixture containing at least one compound of formula I, 9.5–30%, in particular 15–25% of a precursor of a matrix according to the invention, and 1% or less of a photoinitiator.

Component A contains one or more monofunctional unsaturated monomers such as vinyl chlorides, vinylidene chlorides, acrylonitriles, methacrylonitriles, methylacrylates or methacrylates, ethylacrylates or methacrylates, n- or tert-butylacrylates or methacrylates, cyclohexylacrylates or methacrylates, 2-ethylhexylacrylates or methacrylates, benzylacrylates or methacrylates, phenyloxyethylacrylates or methacrylates, hydroxyethylacrylates or methacrylates, hydroxypropylacrylates or methacrylates, lower alkoxyethylacrylates or methacrylates, tetrahydrofurfuryl acrylates or methacrylates, vinyl acetates, vinyl propionates, vinyl succinates, N-vinylpyrrolidones or styrenes.

The compounds enumerated are intended to be illustrative without limiting the scope of the invention. Especially preferred are acrylate type compounds.

Preferred monofunctional acrylates are alkylacrylates or alkyl-methacrylates wherein alkyl straight-chain or branched with 1–15 C atoms, in particular 1–10 C atoms, most preferred are branched alkyl groups with 3–10 C atoms in particular 2-ethylhexyl.

The percentage of component A with respect to the mass of the precursor of the matrix is between 40–95%, preferably 65–90%, and in particular 75–90%.

Component B contains one or more di- or higher functional monomers of the ene type. Examples for preferred monomers are divinylbenzenes, vinyl acrylates, ethylene diacrylates, 1,6-hexandiol diacrylates, bisphenol A diacrylates and dimethacrylates, trimethylolpropane diacrylates, pentaerythritol triacrylates, triethylene glycol diacrylates, ethylene glycol dimethacrylates, tripropylene glycol triacrylates, pentaerythritol triacrylates, pentaerythritol tetraacrylates, ditrimethylpropane tetraacrylates and dipentaerythritol pentaacrylates or hexaacrylates.

Other di- or higher functional ene-monomers and/or oligomers can be used, and the examples given are to illustrate the invention without limiting it. The compounds of component B preferably exhibit not more than two and especially not more than one aromatic cyclic group while compounds with one or more alicyclic cyclic groups are preferred. Preferred are also compounds according to component B with no cyclic groups.

The percentage of component B with respect to the mass of the precursor of the matrix is between 1–13%, preferably 2–10%, and, in particular, 4–8%. Component B is essential and must not be omitted because it tends to improve the phase separation process and allows control of droplet size.

Examples of preferred oligomers are, for example, the commercially available oligomers Ebecryl 1810 (polyester/tetraacrylate) and/or Ebecryl 600 (bisphenol-A-epoxy/diacrylate) and/or Ebecryl 3200 (bisphenol-A-epoxy diacrylate). All Ebecryl materials are available from UCB Ltd., Hertfordshire, England.

The precursor of the polymer matrix preferably contains between 1–30 wt. %, especially 5–15 wt. % and very particularly 5–13% of component C which is preferable a di- or multifunctional oligomer. The specific examples, of oligomers given are to illustrate the invention without limiting it.

The total mass ratio of the components A, B and C with respect to the mass of the precursor of the matrix preferably is more than 60%, especially not less than 75%, in particular at least 85% and very specifically 95% or more.

The precursor of the polymer matrix can contain other components such as, for example, softening agents, stabilizing agents or other additives customary in the field of polymers. The percentage of such and further additions is, however, preferably small and does in particular, not exceed 7.5% and is especially less than 5%. Additives often tend to lower the specific resistance of the cured matrix thus decreasing the holding ratio.

It was found out that electrooptical systems according to the present invention the liquid crystal mixture of which contains at least 30%, especially not less than 50% and in particular more than 75% of one or more SFM compounds exhibits advantageous optical properties and especially a high transmission. Especially preferred are electrooptical systems the liquid mixture of which contains more than 90% of one or more SFM compounds and especially nothing else than SFM compounds. These systems are characterized by advantageous optical properties and by a high value of HR and a very low temperature dependence of HR. Systems of this type are especially suited for high information content display applications.

Especially preferred is a system containing 75–85% of a SFM-based liquid crystal mixture and a precursor of the polymer matrix comprising 75–90% of one or more monofunctional of the ene-type, 4–8% of one or more at least difunctional ene-type, and 5–15% in particular 5–13% of one or more di- or monofunctional ene-type oligomers.

The electrooptical systems according to the present invention are characterized by low to very low operating voltages which is mainly due to the high concentration of the liquid crystal mixture and to the specific formulation of the precursor of the polymer matrix (the resulting polymer matrix is a low surface energy polymer).

Therefore, the use of carbonitrile compounds in the liquid crystal mixtures according to the present invention can often be omitted; carbonitriles are of ten characterized by a high value of dielectric anisotropy (and hence tend to lower the operating voltages) but at the same time they usually result in a decrease of the holding ratio of the system, in particular at higher temperatures or under UV exposure. Because of the low operating voltages and the excellent values of holding ratio of typically 95% or more, the systems according to the present invention are particularly suited for displays applications, especially for active matrix addressed liquid crystal displays.

Especially for this application, a low percentage of the carbonitrile component with respect to the mass of the liquid crystal mixture of less than 10%, especially less than 5% and, very specifically, of 0% is essential.

For other applications, a higher carbonitrile concentration of up to 50% or more was found to be acceptable though not preferred. In case the liquid crystal mixture is based on carbonitriles of formula I, it preferably contains at least 6 and especially at least 7 compounds and/or exhibits a percentage of 3-ring and/or 4-ring compounds, and in particular of 3-ring compounds with respect to the mass of the liquid crystal mixture of at least 18%, specifically of at least 25%, and very specifically of 40% or more.

The cured PDLC film according to the present invention exhibits a Swiss cheese morphology which is surprising because purely ene-type compound based precursors of the matrix tend to form PDLC films with morphologies other than Swiss cheese (in particular with polymer ball morphology) which often exhibit a considerable hysteresis. PDLC systems according to the present invention exhibit hysteresis only to negligible or at least acceptable extent. The advantageous properties of the PDLC systems according to the present invention are due to the improved composition of the precursor of the PDLC film and, in particular, of the precursor of the matrix.

Taking into account the ranges for the percentages of the different components mentioned above, the expert can easily determine without any inventive effort the optimum ratio of the liquid crystal mixture, the component A and the components B and C of the precursor of the matrix in each specific case. Usually a few experiments are sufficient to evaluate optimum concentration ranges for the different components.

The electrooptical system according to the invention are characterized by advantageous properties. They exhibit a low off-state and a high on-state transmission, a high solubility of the liquid crystal mixture in the precursor of the matrix and low to very low operating voltages. Systems with an SFM-type compound based liquid crystal mixture additionally exhibit a high HR and a very low temperature dependence of HR and are therefore well suited for active matrix addressing.

Figure 1:
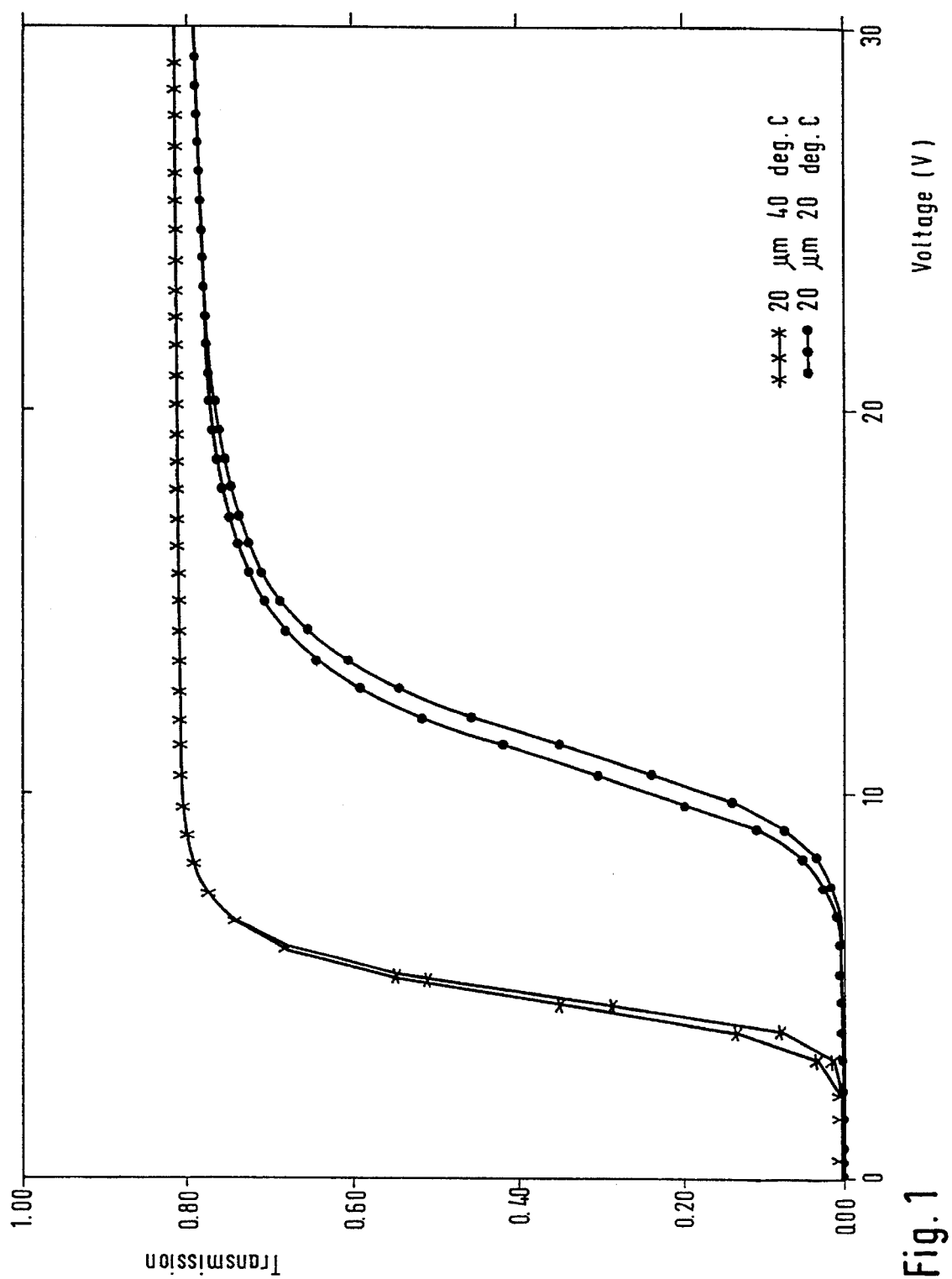
FIG. 1 shows the electrooptical characteristics of transmission vs. voltage for the system according to Experiment 1 below.

The invention is further illustrated by the following examples.

The percentages given throughout the specification are percentages by weight, and temperatures are given in degrees celsius.

Experiments 1–8

In these experiments electrooptical systems are obtained by filling the respective composition described in table 2 between ITO coated glass substrates with subsequent curing (medium pressure Hg lamp producing 500 mW/cm$^2$; curing time about 5.5 sec). The thickness of the electrooptical system is indicated for experiments 1, 3, 4 and 9 in FIG. 1–4 and was 10 μm in experiments 2 and 5–8. At the threshold voltage $V_{10}$, 10% of the maximum transmission for a specific device is observed. The values of transmission are referred to the transmission measured without any cell (i.e. for air) which is set to be 1.0.

The electrooptical systems described are characterized by good electrooptical properties and especially by a high contrast, by good values of transmission and very specifically by high values of holding ratio of typically more than 95% and by low values of operating voltage.

TABLE 1

| Pre-Polymer Composition | EHA | E 600 | E 1810 | E 3200 | HDDA | D 4265 | TMPTA |
|---|---|---|---|---|---|---|---|
| 1 | 85 | 10 | — | — | 4 | 1 | — |
| 2 | 87 | — | 10 | — | — | 1 | 2 |
| 3 | 85 | — | 10 | — | — | 1 | 4 |
| 4 | 85 | — | — | 10 | — | 1 | 4 |
| 5 | 83 | — | — | 10 | — | 1 | 6 |
| 6 | 82 | — | — | 10 | — | 2 | 6 |
| 7 | 82 | 10 | — | — | 6.5 | 1.5 | — |
| 8 | 82.41 | 10.05 | — | — | 6.54 | 1.0 | — |

Polymer Composition (%)

In table 1, the following abbreviations are used:
EHA  2-ethylhexyl-acrylate
E 600  Ebecryl 600 (commercially available bisphenol-A-epoxy/diacrylate)
E 1810  Ebecryl 1810 (commercially available polyester acrylate)
E 3200  Ebecryl 3200 (commercially available low viscosity bisphenol-A epoxy diacrylate)
HDDA  hexandiol diacrylate
D 4265  Darocur ® 4265 (available through E. Merck, Germany)
TMPTA  2-ethyl-2-(hydroxymethyl)-1,3-propanediol triacrylate

TABLE 2

Composition of the precursor of the electrooptical systems

| Experiment 1 | 20% Pre-polymer composition 1 80% LC I |
| Experiment 2 | 20% Pre-polymer composition 1 80% LC II |
| Experiment 3 | 20% Pre-polymer composition 2 80% LC I |
| Experiment 4 | 20% Pre-polymer composition 3 80% LC I |
| Experiment 5 | 20% Pre-polymer composition 4 80% LC I |
| Experiment 6 | 20% Pre-polymer composition 5 80% LC I |
| Experiment 7 | 20% Pre-polymer composition 6 80% LC I |
| Experiment 8 | 20% Pre-polymer composition 7 80% LC I |
| Experiment 9 | 20% Pre-polymer composition 8 80% LC II |

The liquid crystal mixture LC I used in these systems consists of

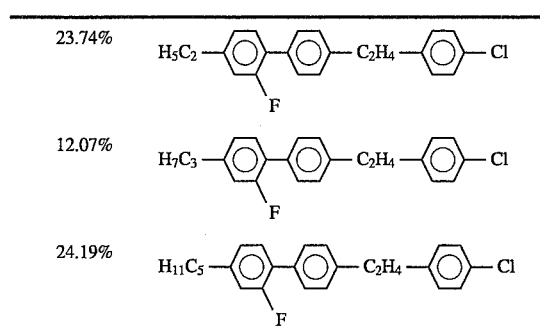

23.74%

12.07%

24.19%

-continued

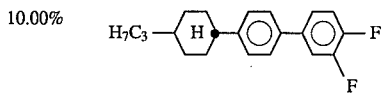

10.00%

| | | |
|---|---|---|
| 10.00% | $H_{11}C_5$—[H]—[○]—[○]—F, F | |
| 5.00% | $H_{11}C_5$—[H]—[○]—[○]—$C_2H_5$, F | |
| 5.00% | $H_7C_3$—[H]—[○]—[○]—$C_2H_5$, F | |
| 5.00% | $H_7C_3$—[H]—[○]—[○]—$C_2H_5$ | |
| 5.00% | $H_{11}C_5$—[H]—[○]—[○]—$C_3H_7$ | | and exhibits the following properties:
  clearing point: 83.4° C.
  dielectrical anisotropy: 6.0 (1 kHz, 20° C.)
  birefringence: 0.1851 (589 nm, 20° C.)
  ordinary index of refraction: 1.5230

The liquid crystalline mixture LC II used in these systems consists of

| | | |
|---|---|---|
| 20.30% | $H_5C_2$—[○]—[○]—$C_2H_4$—[○]—Cl, F | |
| 10.44% | $H_7C_3$—[○]—[○]—$C_2H_4$—[○]—Cl, F | |
| 27.26% | $H_{11}C_5$—[○]—[○]—$C_2H_4$—[○]—Cl, F | |
| 8.00% | $H_7C_3$—[H]—[○]—[○]—F, F | |
| 8.00% | $H_{11}C_5$—[H]—[○]—[○]—F, F | |
| 5.00% | $H_{11}C_5$—[H]—[○]—[○]—$C_2H_5$, F | |

| | | |
|---|---|---|
| 7.00% | $H_7C_3$—[○]—[○]—[○]—Cl, F F | |
| 7.00% | $H_7C_3$—[○]—[○]—[○]—F, F F | |
| 7.00% | $H_7C_3$—[○]—[○]—[○]—Cl, F F | | and exhibits the following properties:
  clearing point: 84° C.
  birefringence: 0.2117 (589 nm, 20° C.)
  ordinary index of refraction: 1.5279 (589 nm, 20° C.)

In FIG. 1, electrooptical characteristics lines for a system according to experiment 1 are shown.

Figure 2:
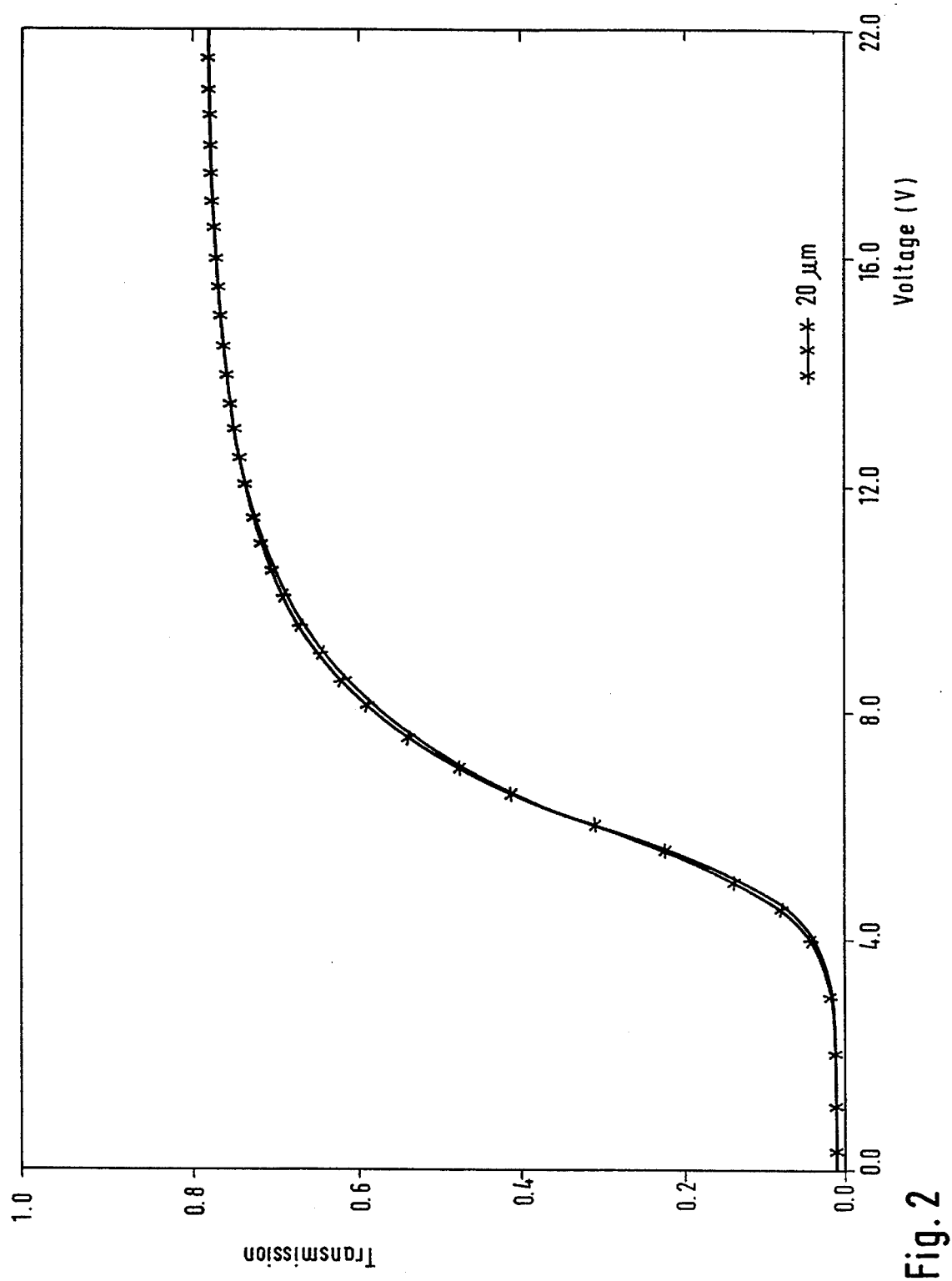
FIG. 2 shows the electrooptical characteristics of transmission vs. voltage for the system according to Experiment 3 below.

In FIG. 2, electrooptical characteristics lines for a system according to experiment 3 are shown.

Figure 3:
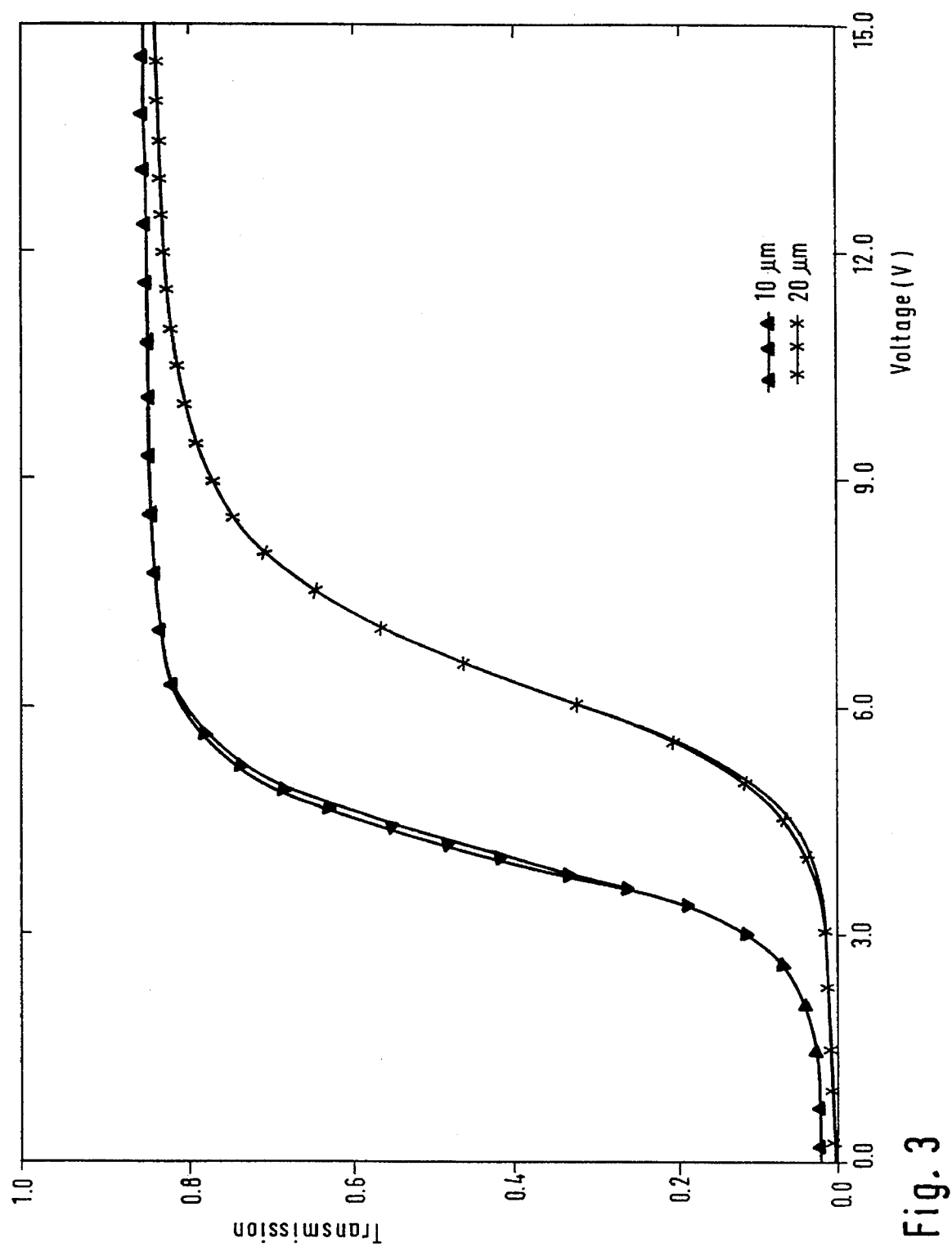
FIG. 3 shows the electrooptical characteristics of transmission vs. voltage for the system according to Experiment 4 below.

In FIG. 3, electrooptical characteristics lines for a system according to experiment 4 are shown.

Figure 4:
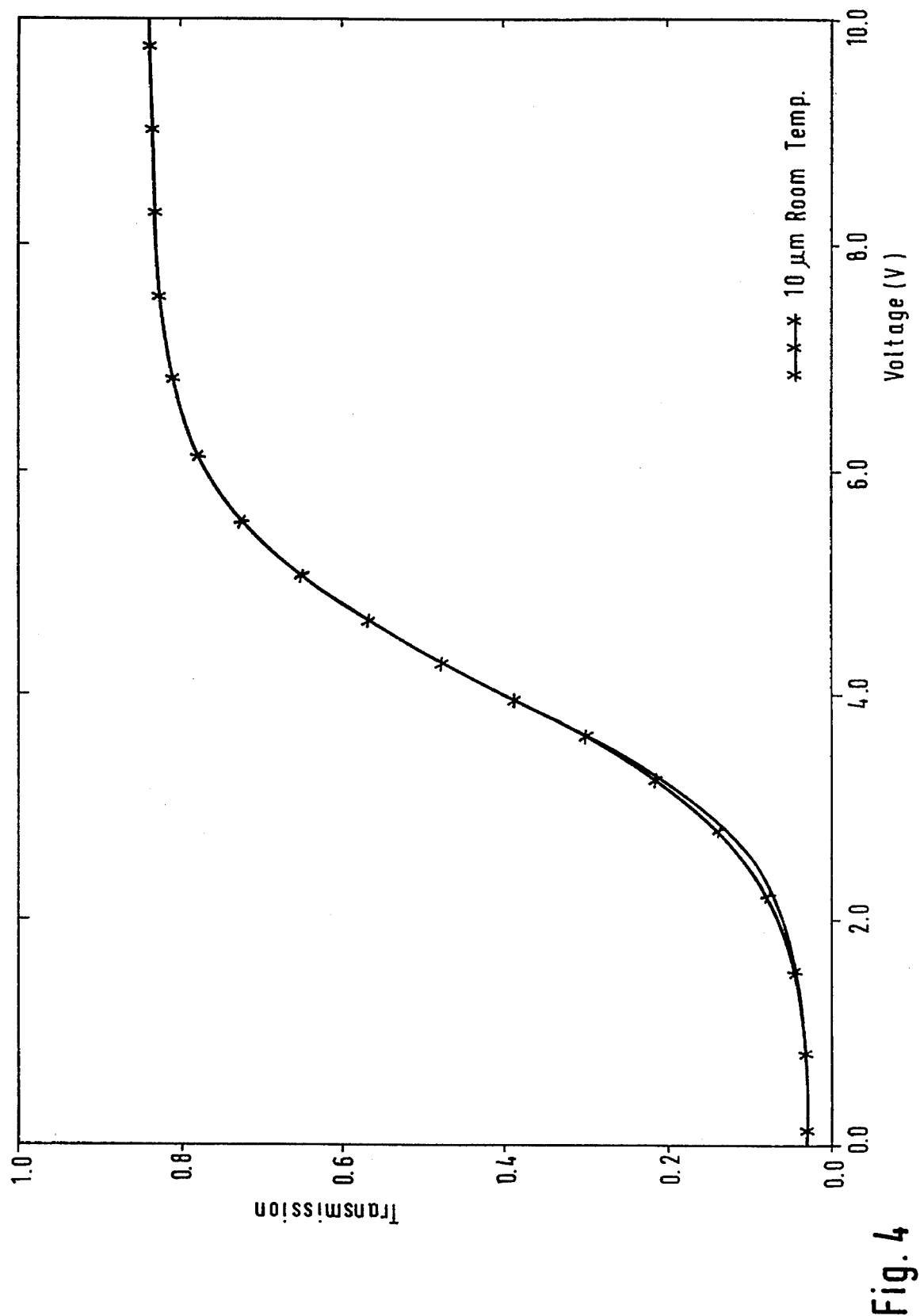
FIG. 4 shows the electrooptical characteristics of transmission vs. voltage for the system according to Experiment 9 below.

In FIG. 4, electrooptical characteristics lines for a system according to experiment 9 are shown.

The systems according to Experiments 5–7 are characterized by the following properties:

| Experiment | $T_{ON}$ [%] | $T_{OFF}$ [%] | $V_{TH}$ [V] | $V_{SAT}$ [V] |
|---|---|---|---|---|
| 5 | 83.3 | 4.6 | 2.9 | 6.7 |
| 6 | 83.2 | 4.6 | 1.5 | 4.3 |
| 7 | 83.2 | 7.7 | 2.6 | 7.3 |

In experiments 5–7, the cell thickness is 10 μm. $V_{TH}$ is the threshold voltage and $V_{SAT}$ is the saturation voltage. $T_{OFF}$ is the off-state transmission, $T_{ON}$ is the transmission obtained for $V_{SAT}$.

Examples 10–28

Electrooptical systems according to the present invention with preferred properties are obtained when mixing one of the following liquid crystal mixtures LCIII–LCXXI with one of the prepolymer compositions 1–8 described above, with subsequent curing as described above in Experiments 1–9.

| | | | |
|---|---|---|---|
| LC III | 30% FET-2Cl | | N 88.4 I |
| | 15% FET-3Cl | | Δn = 0.2077 |
| | 30% FET-5Cl | | $n_o$ = 1.5265 |
| | 10% CEPP-3.FCl | | |
| | 9% CEPP-3.FCl.F | | |
| | 3% CBC-33F | | |
| | 3% CBC-53F | | |
| LC IV | 30% FET-2Cl | | N 89.8 I |
| | 15% FET-3Cl | | Δn = 0.2062 |
| | 30% FET-5Cl | | $n_o$ = 1.5265 |
| | 10% CEPP-3.FCl | | |
| | 10% BCH-52F | | |

-continued

| | 5% 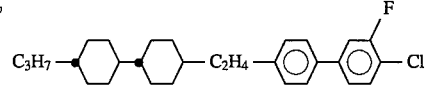 | |
|---|---|---|
| LC V | 30% FET-2Cl<br>15% FET-3Cl<br>30% FET-5Cl<br>10% CEPP-3.FCl<br>10% BCH-52F | N 83.5 I<br>Δn = 0.2082<br>$n_o$ = 1.5278 |
| | 5% 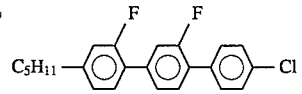 | |
| LC VI | 30% FET-2Cl<br>15% FET-3Cl<br>30% FET-5Cl<br>10% CEPP-3.FCl<br>10% BCH-52F | N 85.9 I<br>Δn = 0.2118<br>$n_o$ = 1.5287 |
| | 5% 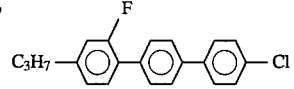 | |
| LC VII | 30% FET-2Cl<br>15% FET-3Cl<br>30% FET-5Cl<br>10% CEPP-3.FCl<br>10% BCH-52F | N 87.2 I<br>Δn = 0.2107<br>$n_o$ = 1.5273 |
| | 5% 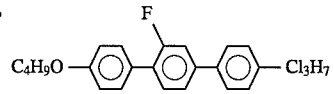 | |
| LC VIII | 21.37% FET-2Cl<br>10.86% FET-3Cl<br>21.77% FET-5Cl<br>9.00% BCH-3F.F<br>9.00% BCH-5.F.F<br>4.50% BCH-52F<br>4.50% BCH-32F<br>4.50% BCH-5F<br>10% CFET-3Cl.F | N 93.2 I<br>Δn = 0.1875<br>$n_o$ = 1.5226 |
| LC IX | 21.37% FET-2Cl<br>10.86% FET-3Cl<br>21.77% FET-5Cl<br>9.00% BCH-3F.F<br>9.00% BCH-5.F.F<br>4.50% BCH-52F<br>4.50% BCH-32F<br>4.50% BCH-5F | N 98.6 I<br>Δn = 0.1919<br>$n_o$ = 1.5226 |
| | 10% 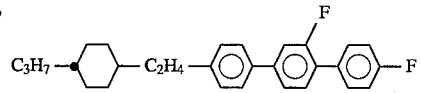 | |
| LC X | 21.37% FET-2Cl<br>10.86% FET-3Cl<br>21.77% FET-5Cl<br>9.00% BCH-3F.F<br>9.00% BCH-5.F.F<br>4.50% BCH-52F<br>4.50% BCH-32F<br>4.50% BCH-5F<br>10.00% CFET-3F | N 93.9 I<br>Δn = 0.1869<br>$n_o$ = 1.5227 |
| LC XI | 21.37% FET-2Cl<br>10.86% FET-3Cl<br>21.77% FET-5Cl<br>9.00% BCH-3F.F<br>9.00% BCH-5.F.F<br>4.50% BCH-52F<br>4.50% BCH-32F<br>4.50% BCH-5F | N 96.9 I<br>Δn = 0.1940<br>$n_o$ = 1.5226 |

-continued
10% 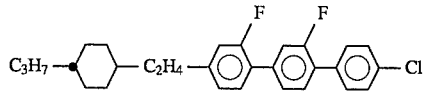
| LC XII | 20.3% FET-2Cl | N 82.4 I |
| | 10.44% FET-3Cl | Δn = 0.2092 |
| | 27.26% FET-5Cl | $n_o$ = 1.5276 |
| | 8% BCH-3F.F | |
| | 8% BCH-5F.F | |
| | 5% BCH-32F | |
7% 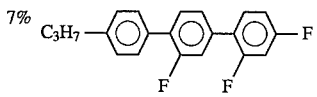
7% 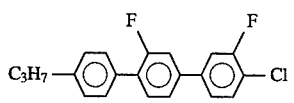
7% 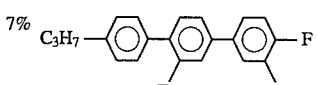
| LC XIII | 20.3% FET-2Cl | N 83.7 I |
| | 10.44% FET-3Cl | Δn = 0.2117 |
| | 27.26% FET-5Cl | $n_o$ = 1.5279 |
| | 8% BCH-3F.F | |
| | 8% BCH-5F.F | |
| | 5% BCH-32F | |
7% 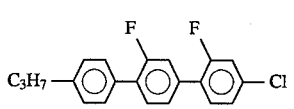
7% 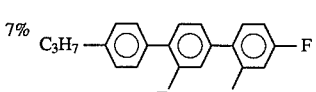
7% 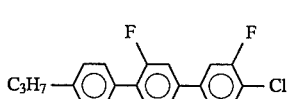
| LC XIV | 19.6% FET-2Cl | N 89.7 I |
| | 10.08% FET-3Cl | Δn = 0.2186 |
| | 26.32% FET-5Cl | $n_o$ = 1.5285 |
8% 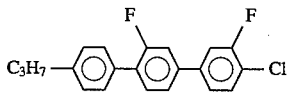
10% 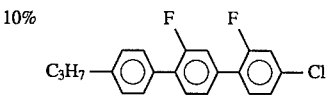
8% 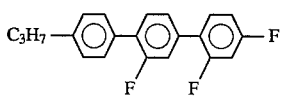
| | 6% BCH-3F.F | |
| | 6% BCH-5F.F | |
| | 3% CBC-33F | |
| | 3% BCH-32F | |
| LC XV | 24.15% FET-2Cl | N 87.6 I |
| | 12.42% FET-3Cl | Δn = 0.2216 |
| | 32.43% FET-5Cl | $n_o$ = 1.5294 |
| | 5% BCH-3F.F | |
| | 5% BCH-5F.F | |
| | 3% CBC-33F | |

-continued

| | 10% | C₃H₇—⟨⟩—⟨F,F⟩—⟨⟩—Cl | |
| --- | --- | --- | --- |
| | 8% | C₃H₇—⟨⟩—⟨F⟩—⟨F⟩—Cl | |
| LC XVI | 22.4% FET-2Cl<br>11.52% FET-3Cl<br>30.08% FET-5Cl<br>5% BCH-3F.F<br>5% BCH-5F.F | | N 84.3 I<br>Δn = 0.2255<br>n₀ = 1.5298 |
| | 12% | C₅H₁₁—⟨⟩—⟨F,F⟩—⟨⟩—Cl | |
| | 6% | C₃H₇—⟨⟩—⟨F⟩—⟨F⟩—Cl | |
| | 8% | C₃H₇—⟨⟩—⟨F,F⟩—⟨⟩—Cl | |
| LC XVII | 20.3% FET-2Cl<br>10.44% FET-3Cl<br>27.26% FET-5Cl<br>9% BCH-3F.F<br>9% BCH-5F.F<br>5% BCH-32F<br>5% BCH-52F | | N 86.6 I<br>Δn = 0.2166<br>n₀ = 1.5260 |
| | 7% | C₃H₇—⟨⟩—⟨F⟩—⟨F⟩—Cl | |
| | 7% | C₃H₇—⟨⟩—⟨F⟩—⟨F⟩—Cl | |
| LC XVIII | 20.3% FET-2Cl<br>10.44% FET-3Cl<br>27.26% FET-5Cl<br>8% BCH-3F.F<br>8% BCH-5F.F<br>5% BCH-52.F | | N 83.7 I<br>Δn = 0.02092<br>n₀ = 1.5276 |
| | 7% | C₃H₇—⟨⟩—⟨⟩—⟨⟩—Cl with F, F below | |
| | 7% | C₃H₇—⟨⟩—⟨F⟩—⟨F⟩—F | |
| | 7% | C₃H₇—⟨⟩—⟨⟩—⟨⟩—Cl with F, F below | |
| LC XIX | 20.3% FET-2Cl<br>10.44% FET-3Cl<br>27.26% FET-5Cl<br>9% BCH-3F.F<br>9% BCH-5F.F<br>5% BCH-32F<br>5% BCH-52.F | | N 85.3 I<br>Δn = 0.2027<br>n₀ = 1.5260 |

-continued

| | | | |
|---|---|---|---|
| | 7% | C₃H₇—⬡—⬡(F)—⬡(F)—F | |
| | 7% | C₃H₇—⬡—⬡(F,F)—⬡(F)—Cl | |
| LC XX | 20.3% FET-2Cl | | N 84.4 I |
| | 10.44% FET-3Cl | | Δn = 0.2126 |
| | 27.26% FET-5Cl | | n₀ = 1.5280 |
| | 8% BCH-3F.F | | |
| | 8% BCH-5F.F | | |
| | 5% BCH-32F | | |
| | 7% | C₃H₇—⬡—⬡(F,F)—⬡(F)—F | |
| | 7% | C₃H₇—⬡—⬡(F)—⬡(F,F)—F | |
| | 7% | C₃H₇—⬡—⬡(F,F)—⬡(F)—Cl | |
| LC XXI | 20.3% FET-2Cl | | N 83.7 I |
| | 10.44% FET-3Cl | | Δn = 0.2117 |
| | 27.26% FET-5Cl | | n₀ = 1.5279 |
| | 8% BCH-3F.F | | |
| | 8% BCH-5F.F | | |
| | 5% BCH-32F | | |
| | 7% | C₃H₇—⬡—⬡(F)—⬡(F,F)—F | |
| | 7% | C₃H₇—⬡—⬡(F,F)—⬡(F)—F | |
| | 7% | C₃H₇—⬡—⬡(F,F)—⬡(F)—Cl | |

For liquid crystal mixtures LC III–XXI, an and no were measured in each case at 20° and with monochromatic light of 589 nm. The phases are denoted by capital letters such as N (nematic), I (isotropic) and so on, and the number between two letters is the phase transition temperature in °C.; specifically NxxI is the clearing point of xx °C. The acronymes used in LC III–XXI are defined as follows:

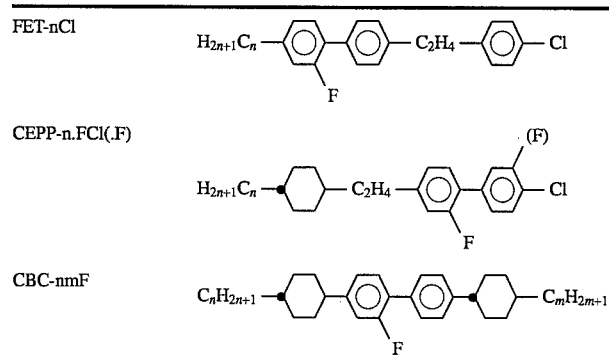

FET-nCl

CEPP-n.FCl(.F)

CBC-nmF

-continued

BCH-nm(F)

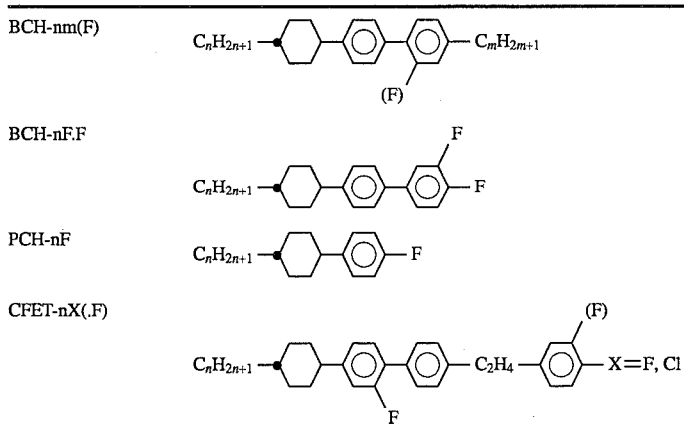

BCH-nF.F

PCH-nF

CFET-nX(.F)

We claim:

1. An electrooptical system which between 2 electrode layers contains a PDLC film comprising a liquid crystal mixture forming microdroplets in an optically isotropic, transparent polymer matrix, in which one of the refractive indices of the liquid crystal mixture is essentially matched to the refractive index of the polymer matrix, and in which one of the two switching states has reduced transmission compared with the other switching state essentially independent of the polarization of the incident light, and wherein the precursor of the PDLC film comprises a) 50–90 wt. % of a liquid crystal mixture containing one or more compounds of the formula I

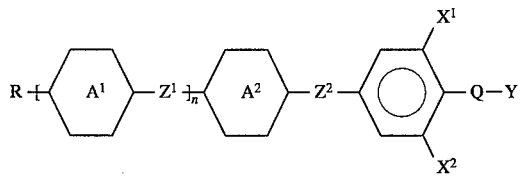

in which $Z^1$ and $Z^2$ independently of one another, are a single bond, —$CH_2CH_2$—, —COO—, —OCO— or —C≡C—,

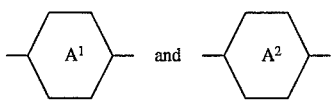

independently of one another, are a trans-1,4-cyclohexylene, 1,4-phenylene, 2-fluoro-1,4-phenylene, 3-fluoro- 1,4-phenylene, 2,3-, 3,5-, 2,5- or 2,6-difluoro-1,4-phenylene and one of

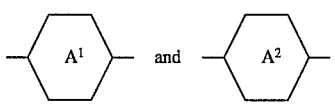

can be pyrimidine- 2,5-diyl, pyridine-2,5-diyl or trans-1,3-dioxane- 2,5-diyl, $X^1$ and $X^2$ independently of one another, are H or F, Q is —$(O)_m$—$C_rF_pH_{2-p}$— or a single bond, Y is F, Cl or CN, m is 0 or 1, r is 1, 2, 3 or 4, p is 0, 1, 2, . . . 2r, n is 0, 1 or 2 and R is alkyl having 1 to 13 C atoms, in which one or two non-adjacent $CH_2$ groups can also be replaced by —O— and/or —CH=CH—, b) 15–49 wt. % of the precursor of the polymer matrix comprising a component A containing between 40–95 wt. % of one or more monofunctional monomers of the ene-type, a component B containing between 1–13 wt. % of one or more at least difunctional monomers of the ene-type, and a component C containing between 1–30 wt. % of one or more mono-, di- or multifunctional oligomers of the ene-type, and c) 0.01–5 wt. % of a radical photoinitiator, with the mass ratios given under a), b) and c) based on the mass of the precursor of the PDLC film and the mass ratios of the components A, B and C based on the mass of the precursor of the polymer matrix.

2. An electrooptical system according to claim 1, wherein the monomers and oligomers of the ene-type are acrylates.

3. An electrooptical system according to claim 1, which is actively addressed and wherein the liquid crystal mixture consists essentially of SFM compounds.

4. An electrooptical system according to claim 1, wherein the liquid crystal mixture comprises carbonitriles with the provision that the liquid crystal mixture contains at least 6 compounds and/or that the ratio of 3- and 4-ring compounds to 2-ring compounds is not less than 0.18.

5. A process for preparing an electrooptical system according to claim 1, wherein the precursor of the PDLC film is optionally heated to form a clear solution, is capillary filled together with spacers between 2 glass substrates being provided with electrode layers, and the system is irradiated with light of suitable wavelength in order to cure the precursor.

6. The electrooptical system of claim 1, wherein the layer thickness between the 2 electrode layers is 2–50 μm.

7. An electrooptical system according to claim 1, wherein the liquid crystal mixture contains at least one compound of the formula I, wherein —Q—Y together is —F, —Cl, —$OCHF_2$, —$OCF_3$ or —$CF_3$.

8. An electrooptical system according to claim 1, wherein the liquid crystal mixture contains at least one compound of the formula I, wherein $Z^2$ is a single bond or —$CH_2CH_2$—.

9. An electrooptical system which between 2 electrode layers contains a PDLC film comprising a liquid crystal mixture forming microdroplets in an optically isotropic, transparent polymer matrix, in which one of the refractive indices of the liquid crystal mixture is essentially matched to the refractive index of the polymer matrix, and in which one of the two switching states has reduced transmission compared with the other switching state essentially independent of the polarization of the incident light, and wherein the precursor of the PDLC film comprises a) 50–90 wt. % of a liquid crystal mixture essentially free of carbonitrile compounds and containing one or more compounds of the formula I

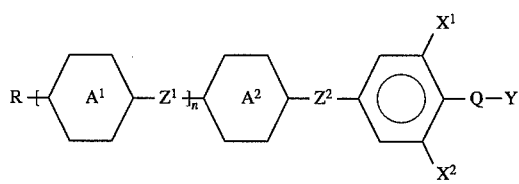

in which $Z^1$ and $Z^2$ independently of one another, are a single bond, —$CH_2CH_2$—, —COO—, —OCO— or —C≡C—,

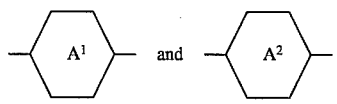

independently of one another, are trans-1,4-cyclohexylene, 1,4-phenylene, 2-fluoro-1,4-phenylene, 3-fluoro-1,4-phenylene, 2,3-, 3,5-, 2,5- or 2,6-di-fluoro-1,4-phenylene and one of

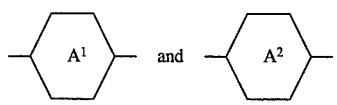

may optionally be pyrimidine-2,5-diyl, pyridine-2,5-diyl or trans-1,3-dioxane- 2,5-diyl, $X^1$ and $X^2$ independently of one another, are H or F, Q is —$(O)_m$—$C_2F_pH_{2r-p}$— or a single bond, Y is F or Cl, m is 0 or 1, r is 1, 2, 3 or 4, P is 0, 1, 2, . . . 2r, n is 0, 1 or 2 and R is alkyl having 1 to 13 C atoms, in which one or two non-adjacent $CH_2$ groups can also be replaced by —O— and/or —CH=CH—, b) 15–49 wt. % of the precursor of the polymer matrix comprising a component A containing between 40–95 wt. % of one or more monofunctional monomers of the ene-type, a component B containing between 1–13 wt. % of one or more at least difunctional monomers of the ene-type, and a component C containing between 1–30 wt. % of one or more mono-, di- or multifunctional oligomers of the ene-type, and c) 0.01–5 wt. % of a radical photoinitiator, with the mass ratios given under a), b) and c) based on the mass of the precursor of the PDLC film and the mass ratios of the components A, B and C based on the mass of the precursor of the polymer matrix.

10. An electrooptical system according to claim 9, wherein the monomers and oligomers of the ene-type are acrylates.

11. An electrooptical system according to claim 9, which is actively addressed and wherein the liquid crystal mixture consists essentially of SFM compounds.

12. A process for preparing an electrooptical system according to claim 9, wherein the precursor of the PDLC film is optionally heated to form a clear solution, is capillary filled together with spacers between 2 glass substrates being provided with electrode layers, and the system is irradiated with light of suitable wavelength in order to cure the precursor.

13. An electrooptical system which between 2 electrode layers contains a PDLC film comprising a liquid crystal mixture forming microdroplets in an optically isotropic, transparent polymer matrix, in which one of the refractive indices of the liquid crystal mixture is essentially matched to the refractive index of the polymer matrix, and in which one of the two switching states has reduced transmission compared with the other switching state essentially independent of the polarization of the incident light, and wherein the precursor of the PDLC film comprises a) 50–90 wt. % of a liquid crystal mixture containing less than 10% of carbonitrile compounds and containing one or more compounds of the formula I

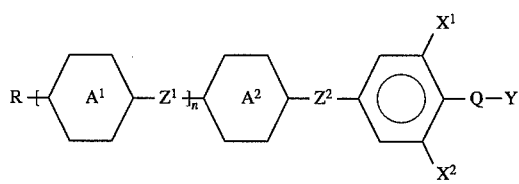

in which $Z^1$ and $Z^2$ independently of one another, are a single bond, —$CH_2CH_2$—, —COO—, —OCO— or —C≡C—,

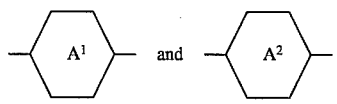

independently of one another, are trans-1,4-cyclohexylene, 1,4-phenylene, 2-fluoro-1,4-phenylene, 3-fluoro-1,4-phenylene, 2,3-, 3,5-, 2,5- or 2,6-di-fluoro-1,4-phenylene and one of

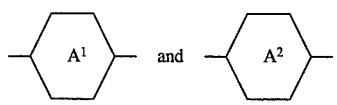

can be pyrimidine-2,5-diyl, pyridine-2,5-diyl or trans-1,3-dioxane-2,5-diyl, $X^1$ and $X^2$ independently of one another, are H or F, Q is —$(O)_m$—$C_rF_pH_{2r-p}$— or a single bond, Y is F, Cl or CN, m is 0 or 1, r is 1, 2, 3 or 4, p is 0, 1, 2, . . . 2r, n is 0, 1 or 2 and R is alkyl having 1 to 13 C atoms, in which one or two non-adjacent $CH_2$ groups can also be replaced by —O— and/or —CH=CH—, b) 15–49 wt. % of the precursor of the polymer matrix comprising
   a component A containing between 40–95 wt. % of one or more monofunctional monomers of the ene-type,
   a component B containing between 1–13 wt. % of one or more at least difunctional monomers of the ene-type, and
   a component C containing between 1–30 wt. % of one or more mono-, di- or multifunctional oligomers of the ene-type, and c) 0.01–5 wt. % of a radical photoinitiator, with the mass ratios given under a), b) and c) based on the mass of the precursor of the PDLC film and the mass ratios of the components A, B and C based on the mass of the precursor of the polymer matrix.

14. An electrooptical system according to claim 13, wherein the monomers and oligomers of the ene-type are acrylates.

15. An electrooptical system according to claim 13, which is actively addressed and wherein the liquid crystal mixture consists essentially of SFM compounds.

16. A process for preparing an electrooptical system according to claim 13, wherein the precursor of the PDLC film is optionally heated to form a clear solution, is capillary filled together with spacers between 2 glass substrates being provided with electrode layers, and the system is irradiated with light of suitable wavelength in order to cure the precursor.

17. An electrooptical system
    which between 2 electrode layers contains a PDLC film comprising a liquid crystal mixture forming microdroplets in an optically isotropic, transparent polymer matrix,
    in which one of the refractive indices of the liquid crystal mixture is essentially matched to the refractive index of the polymer matrix, and
    in which one of the two switching states has reduced transmission compared with the other switching state essentially independent of the polarization of the incident light, and
    wherein the precursor of the PDLC film comprises
    a) 50–90 wt. % of a liquid crystal mixture having a birefringence value of from 0.1851 or higher and containing one or more compounds of the formula I

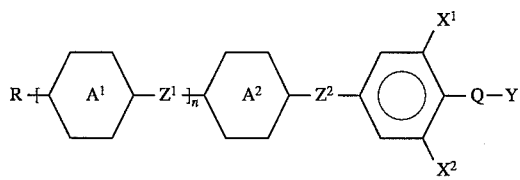

in which
$Z^1$ and $Z^2$ independently of one another, are a single bond, —$CH_2CH_2$—, —COO—, —OCO— or —C≡C—,

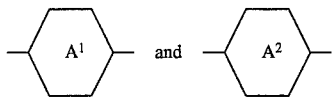

independently of one another, are trans-1,4-cyclohexylene, 1,4-phenylene, 2-fluoro-1,4-phenylene, 3-fluoro-1,4-phenylene, 2,3-, 3,5-, 2,5- or 2,6-di-fluoro-1,4-phenylene and one of

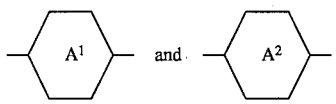

may optionally be pyrimidine-2,5-diyl, pyridine-2,5-diyl or trans-1,3-dioxane-2,5-diyl, $X^1$ and $X^2$ independently of one another, are H or F, Q is —$(O)_m$—$C_rF_pH_{2r-p}$— or a single bond, Y is F, Cl or CN, m is 0 or 1, r is 1, 2, 3 or 4, p is 0, 1, 2, . . . 2r, n 0, 1 or 2 and R is alkyl having 1 to 13 C atoms, in which one or two non-adjacent $CH_2$ groups can also be replaced by —O— and/or —CH=CH—, b) 15–49 wt. % of the precursor of the polymer matrix comprising
   a component A containing between 40–95 wt. % of one or more monofunctional monomers of the ene-type,
   a component B containing between 1–13 wt. % of one or more at least difunctional monomers of the ene-type, and
   a component C containing between 1–30 wt. % of one or more mono-, di- or multifunctional oligomers of the ene-type, and c) 0.01–5 wt. % of a radical photoinitiator, with the mass ratios given under a), b) and c) based on the mass of the precursor of the PDLC film and the mass ratios of the components A, B and C based on the mass of the precursor of the polymer matrix.

18. An electrooptical system according to claim 17, wherein the monomers and oligomers of the ene-type are acrylates.

19. An electrooptical system according to claim 17, which is actively addressed and wherein the liquid crystal mixture consists essentially of SFM compounds.

20. A process for preparing an electrooptical system according to claim 17, wherein the precursor of the PDLC film is optionally heated to form a clear solution, is capillary filled together with spacers between 2 glass substrates being provided with electrode layers, and the system is irradiated with light of suitable wavelength in order to cure the precursor.

21. A precursor of a PDLC film comprising
    a) 50–90 wt. % of a liquid crystal mixture containing one or more compounds of the formula I

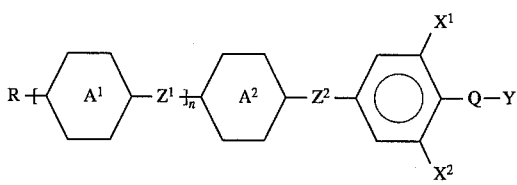

in which $Z^1$ and $Z^2$ independently of one another, are a single bond, $-CH_2CH_2-$, $-COO-$, $-OCO-$ or $-C\equiv C-$,

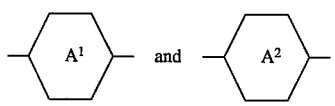

independently of one another, are trans-1,4-cyclohexylene, 1,4-phenylene, 2-fluoro-1,4-phenylene, 3-fluoro-1,4-phenylene, 2,3-, 3,5-, 2,5- or 2,6-di-fluoro-1,4-phenylene and one of

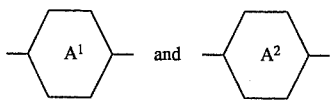

may optionally be pyrimidine-2,5-diyl, pyridine-2,5-diyl or trans-1,3-dioxane-2,5-diyl, $X^1$ and $X^2$ independently of one another, are H or F, Q is $-(O)_m-C_2F_pH_{2r-p}-$ or a single bond, Y is F, Cl or CN, m is 0 or 1, r is 1, 2, 3 or 4, p is 0, 1, 2, ... 2r, n is 0, 1 or 2 and R is alkyl having 1 to 13 C atoms, in which one or two non-adjacent $CH_2$ groups can also be replaced by $-O-$ and/or $-CH=CH-$, b) 15–49 wt. % of a precursor of a polymer matrix comprising a component A containing between 40–95 wt. % of one or more monofunctional monomers of the ene-type, a component B containing between 1–13 wt. % of one or more at least difunctional monomers of the ene-type, and a component C containing between 1–30 wt. % of one or more mono-, di- or multifunctional oligomers of the ene-type, and c) 0.01–5 wt. % of a radical photoinitiator, with the mass ratios given under a), b) and c) based on the mass of the precursor of the PDLC film and the mass ratios of the components A, B and C based on the mass of the precursor of the polymer matrix.

22. The precursor of a PDLC film of claim 21, wherein the liquid crystal mixture is essentially free of carbonitrile compounds.

23. The precursor of a PDLC film of claim 21, wherein the liquid crystal mixture contains less than 10% of carbonitrile compounds.

24. The precursor of a PDLC film of claim 21, wherein the liquid crystal mixture has a birefringence value of 0.1851 or higher.

* * * * *